United States Patent [19]

Sundheimer

[11] Patent Number: 4,714,055

[45] Date of Patent: Dec. 22, 1987

[54] WATER AND STEAM SEPARATING DEVICE FOR DRYING MOIST STEAM

[75] Inventor: Patrick Sundheimer, Saint-Maur-des-Fosses, France

[73] Assignee: Framtome & Cie, Courbevoie, France

[21] Appl. No.: 777,132

[22] Filed: Sep. 17, 1985

[30] Foreign Application Priority Data

Sep. 17, 1984 [FR] France ............................. 8414212

[51] Int. Cl.[4] ............................................. F22B 1/06
[52] U.S. Cl. ..................................... 122/488; 55/318; 55/440; 122/34
[58] Field of Search ................. 55/318, 345, 348, 337, 55/440, 442, 443, 457, DIG. 37, 525; 122/34, 488–492

[56] References Cited

U.S. PATENT DOCUMENTS

| 1,928,706 | 10/1933 | Sillers . | |
|---|---|---|---|
| 2,178,240 | 10/1939 | Pascale | 55/442 |
| 2,276,277 | 3/1942 | Waters . | |
| 2,434,677 | 1/1948 | Stillman | 55/318 |
| 2,641,331 | 6/1953 | Hudson | 55/442 |
| 3,720,046 | 3/1973 | Kudirka et al. | 55/345 |
| 3,751,866 | 8/1975 | Sokolowski . | |
| 3,804,069 | 4/1974 | Bennett | 122/34 |

FOREIGN PATENT DOCUMENTS

| 9677666 | 12/1957 | Fed. Rep. of Germany . | |
|---|---|---|---|
| 2428787 | 1/1980 | France . | |
| 1432337 | 4/1976 | United Kingdom | 55/440 |

Primary Examiner—Bernard Nozick
Attorney, Agent, or Firm—Pollock, Vande Sande & Priddy

[57] ABSTRACT

The invention concerns a device for separating water and steam for the drying of a moist steam which has a rising current at the inlet of the device. The device comprises at least an assembly (8) comprising drying elements in a zone (12) in which a perforated panel (11) is located. The perforated vertical panel (11) is formed by a grid of expanded metal for deflecting the incident stream (9) of the steam and rendering it horizontal or sightly downwardly inclined (16). The invention is in particular applicable to steam generators of pressurized water nuclear reactors.

3 Claims, 6 Drawing Figures

4,714,055

WATER AND STEAM SEPARATING DEVICE FOR DRYING MOIST STEAM

FIELD OF THE INVENTION

The invention relates to water and steam separating device for drying a moist steam, and, in particular, a drying device disposed at the outlet of the steam in the upper part of a steam generator of a pressurized water nuclear reactor.

BACKGROUND OF THE INVENTION

In nuclear power stations comprising a pressurized water reactor, the steam produced in the steam generators has a moisture content which is relatively low but nonetheless excessive for enabling this steam to be used in the turbines, without intermediate drying.

Steam generators of pressurized water reactors therefore comprise, in their upper part in the outlet path of the steam, drying devices which are of two types and are disposed in succession in the path of the steam. First of all, the steam enters centrifugal separators where it is driven in rotation in a helix, the droplets of water contained in the steam separating from the latter by the centrifugal effect before being trapped on a cylindrical wall which ensures the return of the water by gravity to the feed zone of the steam generator.

At the outlet of the centrifugal separators, the steam undergoes a second drying, termed fine drying, in baffle separators which produce sudden successive modifications in the direction of flow of the steam. The known baffle separators, which have a very high efficiency, comprise troughs of vertical positions associated with the baffles so as to recover the water separated from the steam. These troughs have hollow cross-sectional shapes in horizontal planes whose cavity faces toward the incident current of the steam so that the droplets of water separated from the steam on the walls of the baffles are stopped by the troughs, collected and conveyed by gravity to the lower part of the separators and then to the feed zone of the steam generator through drain conduits.

Although these troughs substantially increase the efficiency of the baffle driers, they have drawbacks which render their use more difficult.

First of all, these troughs interposed in the path of the steam increase the pressure drop in the drier. Further, they create a zone in which the steam is under overpressure just upstream of the liquid film constituted by the droplets collected in the troughs. In this overpressure zone, the current of steam and the droplets of water have a practically zero velocity, so that water particles are in equilibrium with a steam under overpressure. These particular conditions do not facilitate the elimination of the water by gravity flow.

Moreover, the current of steam is rising during the entire travel through the driers which are disposed in succession one above the other. This rising current entrains the droplets of water upwardly into zones located upstream of the troughs and in counter-current relative to the liquid film which retards its gravity flow.

The construction of baffle driers has been proposed in the form of assemblies constituted by a perforated vertical panel contacted by the incident current of steam which, after having travelled through the perforated panel, reaches a zone enclosing the baffles and the water-recovery troughs. The perforated panel, constituting the inlet wall of the drier, creates a pressure drop in the flow of the steam and deviates this current of steam downwardly. There is used, for example, as a perforated steam inlet panel a sheet of metal comprising orifices having a dimension and an arrangement which are chosen to modify substantially the flow of the steam without excessively decreasing the pressure drop. However, such deflecting devices have a very limited efficiency.

The use of panels has also been proposed constituted by a frame in which are placed series of parallel strips which are downwardly inclined in the direction of flow of the steam, of the venetian blind type. Such panels may have high efficiency as concerns the deflection of the current of steam, but they are delicate to construct when they are intended to come into contact with steam at very high temperature circulating at very high velocity. Whatever the method of fabrication of these panels, great strength and durability cannot be guaranteed.

SUMMARY OF THE INVENTION

An object of the invention is therefore to provide a water and steam separating device for the drying of moist steam having a rising current at the inlet of the separating device, comprising at least an assembly interposed in the path of the steam and constituted by drying elements and a perforated vertical panel having one side, or inlet side, which receives the moist steam which reaches, after passing through the perforated panel, a zone containing the drying elements comprising baffles for deviating the current of steam and troughs for recovering water separated from the steam disposed vertically and in such manner that the horizontal cross-section has a hollow part facing toward the incident current of the steam, which device is highly efficient, simple to construct and very strong.

For this purpose, the perforated vertical panel is constituted by a grid of expanded metal whose cells permit the passage of the steam and are defined by strips inclined downwardly in the direction of the passage of the steam so as to deflect this steam in such manner that its path is substantially horizontal, or slightly downwardly inclined, at the moment it comes into contact with the drying elements.

BRIEF DESCRIPTION OF THE DRAWINGS

In order to explain the invention, there will now be described by way of non-limiting example a water and steam separating device according to the invention, employed for the drying of moist steam produced by a steam generator of a pressurized water nuclear reactor.

DETAILED DESCRIPTION

Figure 1:
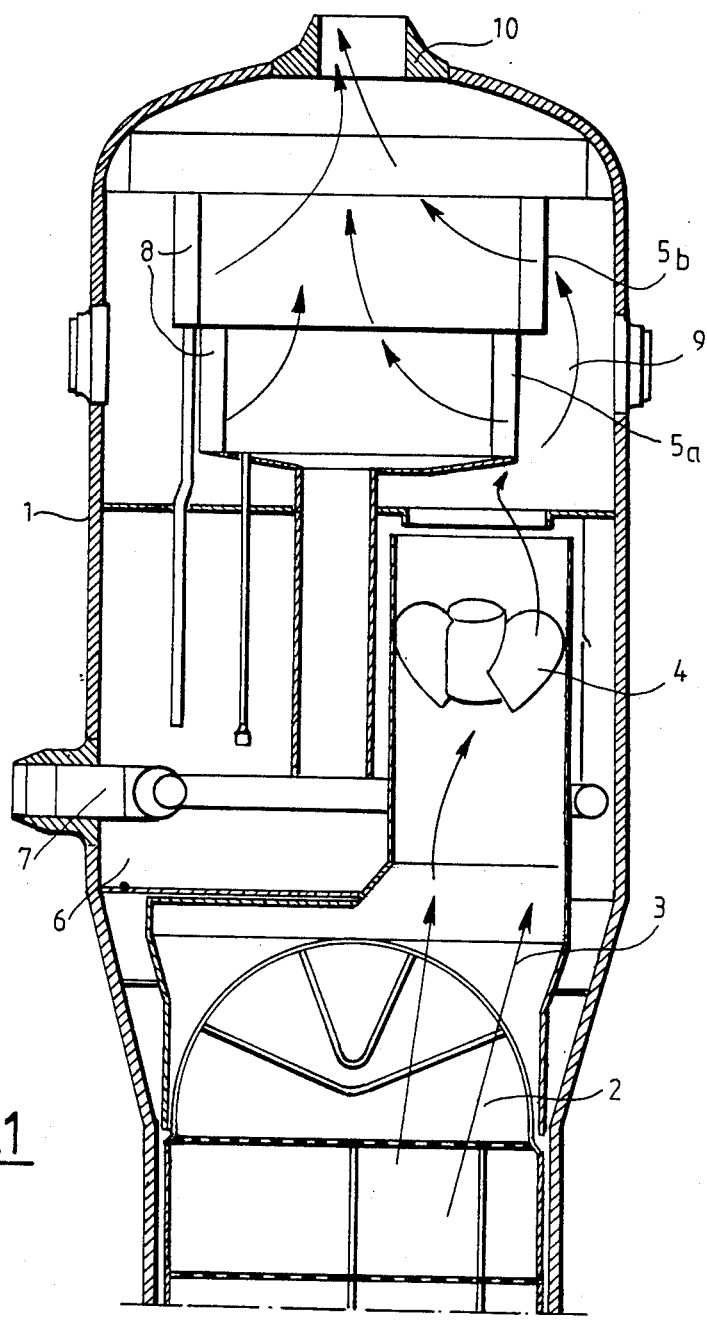
FIG. 1 is a sectional view in a vertical plane of the upper part, enclosing the drying devices, of a steam generator of a pressurized water nuclear reactor.

FIG. 1 shows the upper part of a steam generator whose outer casing 1 has a diameter exceeding the diameter of the lower part of the steam generator enclosing the tube bundle whose upper part is shown in FIG. 1.

The nest 2 comprises an assembly of tubes within which circulates the water under pressure coming from the vessel of the nuclear reactor for the heating of the feed water of the steam generator and then its vaporization, the steam produced entering the upper part 1 of the steam generator in a substantially vertical path represented by the arrows 3.

The casing 1 of the upper part of the steam generator encloses the centrifugal separators such as 4 and two drying stages having baffles 5a, 5b placed one above the other. The steam issuing from the bundle first of all enters the centrifugal separators where its path becomes helical, a part of the water droplets entrained by the steam being then deposited on the cylindrical inner wall of the centrifugal separators which ensures the return of this water to the zone 6 feeding water to the steam generator in the region of which is placed the feed ring 7 of the steam generator ensuring the return of the condensed water to the outlet of the turbines.

Disposed above the centrifugal separators 4 are two separator stages having baffles 5a and 5b each comprising four drying units 8 disposed on the vertical sides of a parallelepiped whose disposition is central inside the casing 1 of the upper part of the steam generators.

The partly-dried steam coming from the centrifugal separators 4 comes into contact with the inlet side of the drying elements 8 in a rising current of direction 9, passes through these drying elements 8 and issues from the steam generator through the outlet pipe 10 extending through the casing 1 in the upper part of the latter.

Figure 2:
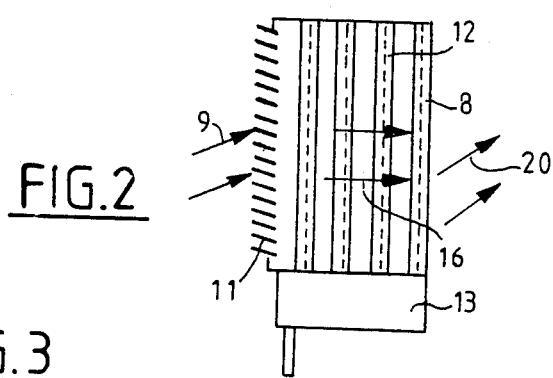
FIG. 2 is a sectional view in a vertical plane of a drying unit of a baffle drier of the steam generator shown in FIG. 1.

FIG. 2 shows, in vertical section in the direction of travel of the steam, a drying element 8 in a larger scale than in FIG. 1.

This element 8 has the general shape of a parallelepiped and comprises a perforated inlet wall 11, a drying zone 12 and a water recovery zone 13.

Figures 3, 3A:
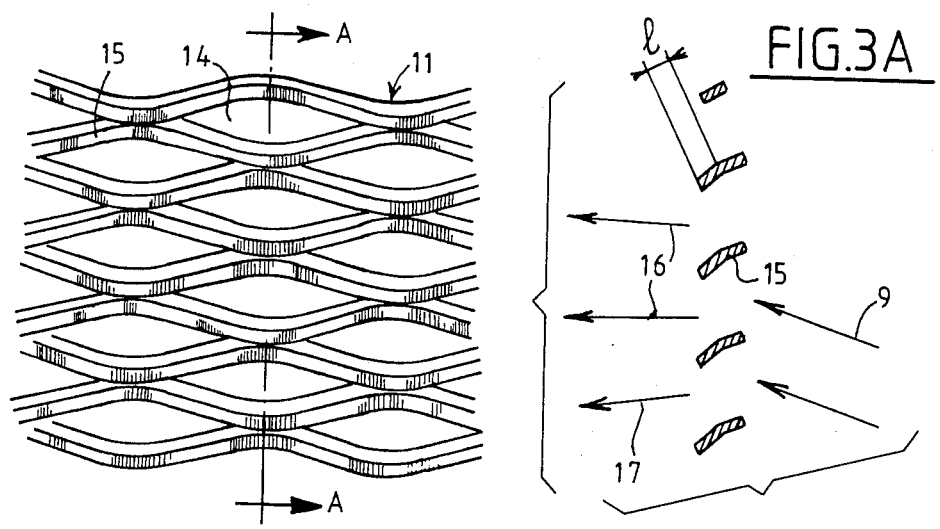
FIG. 3 is a front elevational view of a part of a grid of expanded metal constituting the inlet wall of the drying unit shown in FIG. 2.
FIG. 3A is a sectional view taken on line A—A of FIG. 3.

As can be seen in FIGS. 3 and 3A, the panel 11 is formed by a grid of expanded metal whose cells 14 have a diamond shape and are defined by strips 15 which are downwardly inclined in the direction in which the steam passes through the panel.

Such a grid of expanded metal is a product known per se and can be produced by the cutting of a sheet of metal followed by a stretching of the sheet in the course of which the bands separating the cut-out cells assume an identical inclination relative to the plane of the sheet and constitute strips which are evenly-spaced apart in the cross-sectional planes of the sheet in the main directions of the cells of the network, as can be seen in FIG. 3A.

The grid of expanded metal consequently has a structure including inclined strips 15 comparable to the structure of a panel having inclined strips of the venetian blind type.

Such a structure produces a deflection of a current of fluid passing through the cells 14, as can be seen in FIG. 3A, in respect of the incident steam stream 9 whose direction of travel 16, after having passed through the grid 11, is substantially horizontal. The grid is of course disposed in such manner that the strips 19 are downwardly inclined in the direction in which the stream of steam passes through the grid.

The extent of the deflection produced by the grid 11 depends on several parameters and in particular on the width 1 of the metal bands between two cut edges of the sheet, termed straps, and on the dimension of the mesh 14 both in the longitudinal direction corresponding to the length of the cut edges of the sheet and in the transverse direction corresponding to the direction in which this sheet has been stretched in order to constitute the grid.

By acting on these various parameters, it is possible to determine a sufficient deflection of the incident stream of steam to render its path horizontal (direction 16) or even downwardly inclined (direction 17) in the drying zone 12 disposed beyond the grid 11.

However, the pressure drop of the device increases when the parameters of the grid are modified in order to increase the deflection.

Therefore, characteristics of the structure of the grid must be chosen to obtain a stream of steam which travels in a direction close to the horizontal in the zone 12 while limiting the pressure drop to an acceptable value.

Figure 4:
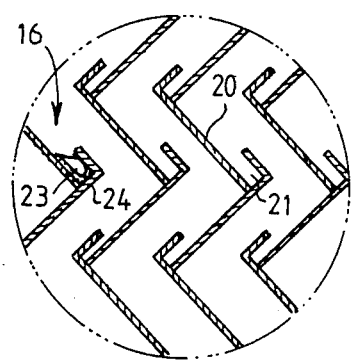
FIG. 4 is a sectional view in a horizontal plane of a part of the zone enclosing the drying elements of the unit shown in FIG. 2.

FIG. 4 shows a part of the horizontal section of the zone 12 in which are disposed baffles 20 formed by vertical, bent or connected metal sheets constituting successive dihedral corners disposed in one direction or the other and close to 90°. The baffles 20 are disposed successively in a direction parallel to the longitudinal direction of the drying unit, i.e., in the horizontal direction parallel to the panel 11 constituting the inlet side of this drying unit. The baffles 20 are disposed in such manner as to be interposed in the path of the steam 16 inside the drying zone 12 in a substantially horizontal direction.

A vertical trough 21 is fixed in the region of each of the 90° dihedral corners of the baffles, alternately on one side and the other of the baffle 20.

The cross-sections of the troughs 21 have a hollow rectangular shape which is open in the direction of the incident stream of the steam 16. The troughs 21 stop the water droplets deposited by the steam on the walls of the baffles and cause the water thus collected in the lower part of the drying unit to reach the recovery zone 13. The troughs 21 are also responsible for the constitution of zones 23 in which the steam is under overpressure immediately upstream of the water 24 collected in the trough 21. In this zone 23, the droplets of liquid and the steam have a zero velocity component in the horizontal plane.

However, this does not have an adverse effect on the gravity flow of the liquid film 24 since the steam stream in direction 16 is either horizontal or slightly downwardly inclined owing to the deflection of the sheet of expanded metal 11.

Thus it can be seen that one of the advantages of the device according to the invention is to permit the use of drying elements comprising baffles and vertical troughs under very high efficiency conditions. These advantages are obtained owing to a deflecting element which is very easy to construct and has a very good strength, since it is produced from a sheet of metal by a punching operation followed by stretching or expanding with no welding required. This element in one piece therefore has much greater strength and is much more reliable than an assembled element, such as a panel of the venetian type having mounted fins.

Figure 5:
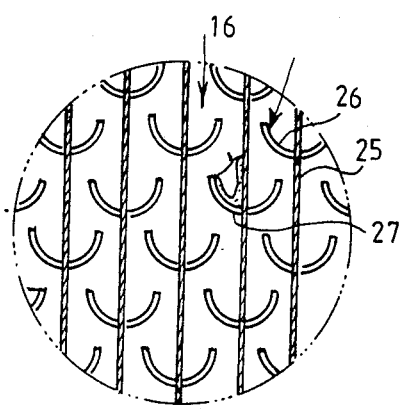
FIG. 5 is a view similar to FIG. 4 of a modification of the zone enclosing the drying elements.

FIG. 5 shows a modification of the construction of the drying zone, the baffles and the troughs being made from the same elements 26 in the shape of portions of a cylinder which have vertical axes and are secured to vertical planar plates 25. The incident stream of steam 16 is deviated by the successive elements 26 whose semicircular sections are open toward the incident stream of steam. The elements 26 also constitute troughs for recovering the film of water 27 formed from the droplets deposited on their inner surface. As before, the gravity flow of the film 27 is only very slightly hindered, or even facilitated, by the stream of stream 16 whose direction of travel is horizontal or slightly downwardly inclined.

The scope of the invention is not limited to the embodiment just described. Thus, the separating device may comprise an inlet panel of expanded metal and drying devices (baffles and troughs) of a type different from those described, the baffles and the troughs being formed by different elements or by the same elements.

The grid of expanded metal may have cells of a shape which is different from the diamond shape described.

The dimensions of the grid will be defined in accordance with the desired deflection of the stream of steam and the acceptable pressure drop under the conditions of utilization of the device.

The device according to the invention is applicable not only to steam generators of pressurized water nuclear reactors, but also to other types of steam generators and even to different installations of steam generators in which a moist steam is obtained which has rising outlet current.

I claim:

1. A device for separating water and steam for the drying of moist steam which has a rising current at the inlet and at the outlet of the separating device, said device comprising at least one assembly interposed in the path of the steam and formed by drying elements and a perforated vertical panel having an inlet side, which receives the moist steam which reaches, after having passed through the perforated panel, a zone enclosing the drying elements comprising baffles constituted by walls disposed in a general vertical direction and transverse with respect to the path of the steam for deviating the stream of steam, and troughs for recovering the water separated from the steam, disposed vertically and in such manner that their horizontal cross-sectional shape has a hollow part which faces toward the incident stream of steam, wherein the perforated vertical panel comprises a grid of expanded metal produced by the cutting of a sheet of metal followed by stretching of the sheet in the course of which the bands separating the cutout cells assume an identical inclination relative to the plane of the sheet and constitute inclined strips defining the cells, the grid being disposed so that the strips are downwardly inclined in the direction of the travel of the steam through the panel for the deflection of said steam so that its path is substantially horizontally or slightly downwardly inclined at the moment it comes into contact with the drying elements, the stream of steam having thus no vertically upwardly directed component of its speed vector when it comes into contact with the troughs.

2. A device for separating water and steam according to claim 1, wherein the grid of expanded metal comprises diamond-shaped cells whose large diagonals are horizontal.

3. A device for separating water and steam according to claim 1 or 2, disposed in the outlet path of the moist steam in the uper part of a steam generator of a pressurized water nuclear reactor.

* * * * *

UNITED STATES PATENT AND TRADEMARK OFFICE
CERTIFICATE OF CORRECTION

PATENT NO. : 4,714,055
DATED : DECEMBER 22, 1987
INVENTOR(S) : SUNDHEIMER ET AL.

It is certified that error appears in the above-identified patent and that said Letters Patent is hereby corrected as shown below:

Item [73]:

Title page, change "Framtome" to --Framatome--

Signed and Sealed this

Sixteenth Day of April, 1991

Attest:

HARRY F. MANBECK, JR.

*Attesting Officer*        *Commissioner of Patents and Trademarks*